May 7, 1963 A. VANG 3,089,053
MERCURY DISCHARGE TUBE
Filed Sept. 23, 1960
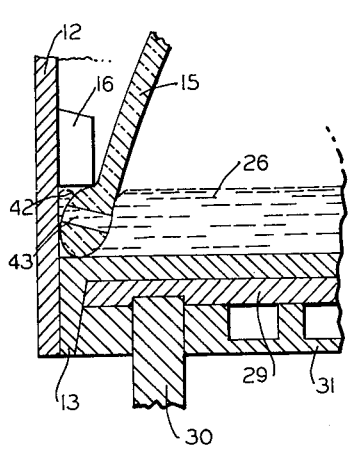
FIG_3
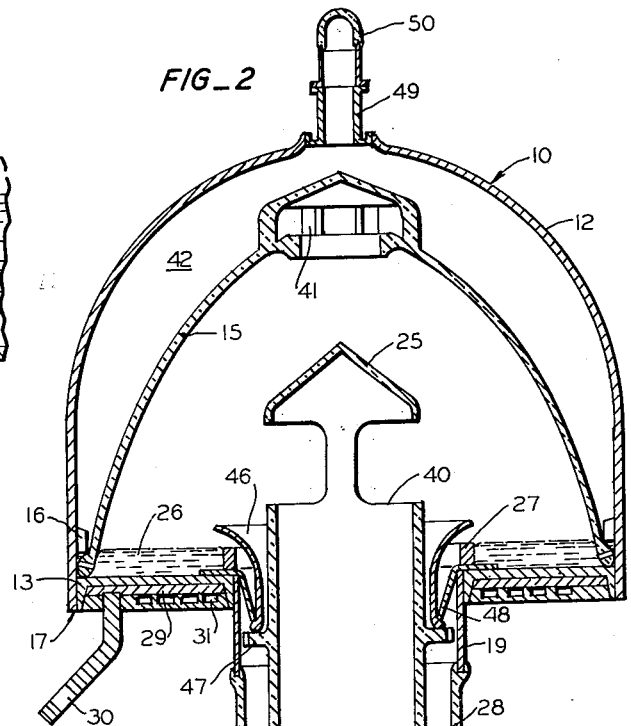
FIG_2
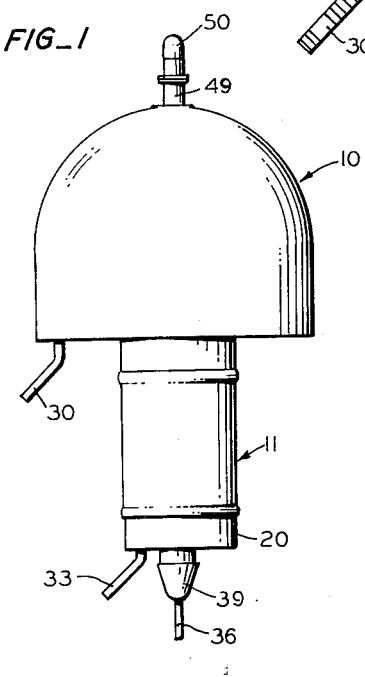
FIG_1
INVENTOR.
ALFRED VANG
BY Hoppe and Mitchell
ATTORNEYS

United States Patent Office 3,089,053
Patented May 7, 1963

3,089,053
MERCURY DISCHARGE TUBE
Alfred Vang, Rancho Santa Fe, Calif., assignor of one-third to Anna Vang, and one-third to Alfred Vang, trustee
Filed Sept. 23, 1960, Ser. No. 57,999
6 Claims. (Cl. 313—165)

This invention relates generally to ignition type mercury discharge tubes and more particularly relates to an improved tube structure having spaced anode and cathode mercury pools.

One of the objects of the present invention is to provide an improved mercury discharge tube structure which is durable and has a long operating life at high current capacities.

Another object of the present invention is to provide a mercury discharge tube wherein the operating mercury is continuously recycled and purified to insure uniform tube operating characteristics and long tube life.

It is still another object of the present invention to provide an arc discharge tube structure wherein the arc path from cathode to anode is indirect thereby preventing the cathode spot from moving toward the anode.

One other object of the present invention is to provide a mercury discharge tube structure having conduit means for directly but interruptively returning condensed mercury from the anode pool to the cathode pool.

A further object of the present invention is to provide improved means for condensing and collecting mercury vapors formed within a mercury discharge tube.

The foregoing and other objects and advantages of this invention will become apparent to those skilled in this art upon an understanding of the preferred embodiment described herein and illustrated in the accompanying drawing wherein:

FIG. 1 is an elevational view of a tube embodying features of the present invention;

FIG. 2 is a vertical sectional view taken along the tube center-line illustrating the internal structure of the tube; and FIG. 3 is an enlarged vertical sectional view of a portion of FIG. 2.

Referring specifically to FIG. 1, the selected embodiment of the invention illustrated herein comprises an envelope including a hemispherical dome referred to as 10 and a generally cylindrical section or well 11 depending from dome 10. As more clearly appears in FIG. 2, the dome 10 includes a hemispherical shell 12 provided with an annular anode member 13 sealed to its lower margin. Cylindrical shell 14 depends from the central bore of annular anode member 13 forming the cylindrical section 11 of the envelope.

An inner dome 15 is supported within hemispherical shell 12 along the outer periphery of anode member 13. Inner dome 15 is formed from dielectric material such as glass and is secured in position on anode member 13 by a plurality of lugs 16 provided around the inside of the lower margin of hemispherical shell 12. The hemispherical shell 12 and anode member 13 are fabricated from metal such as type 304 stainless steel and are fastened together as at 17 to provide an air-tight seal.

Cylindrical shell 14 includes a central dielectric section 18 preferably fabricated from glass, joined to metallic sections at each end. For structural strength end sections 19, 20 are fabricated from metal having thermal expansion characteristics similar to glass, such as the 29% nickel, 17% cobalt, 53.7% iron, and 0.3% manganese alloy sold under the trade name of Kovar. The upper end section 19 is fastened around its outer periphery to anode member 13 in an air-tight seal.

The lower end section 20 of cylindrical shell 14 is closed by an electrically conductive cathode member 21 carrying an igniter means 22 on the centerline of the tube. The cathode of the tube comprises a pool 23 of mercury contained on cathode member 21 at the lower end of cylindrical shell 14. The igniter means 22 extends upwardly through the cathode pool 23. Cathode member 21 is sealed to the inside periphery of end section 20 in an air-tight seal.

A concentric sleeve 24 is supported upon cathode member 21 within cylindrical shell 14 and extends upwardly into the interior of inner dome 15 to a level above the surface of the anode pool described herein. Sleeve 24 is provided with an inverted conically shaped baffle 25 supported from the side walls of sleeve 24 a spaced distance above its open upper end. The sleeve and accompanying baffle are fabricated from heat resistant dielectric material such as heat-treated 96% silica glass sold under the trade name of Vycor.

An annular anode pool 26 of mercury is contained within the dome 10 of the tube directly upon anode member 13 by means of Vycor overflow ring 27 secured around the inner edge of annular anode member 13. Ring 27 forms a weir over which excess mercury from the anode pool 26 flows into conduit means comprising annulus 28 formed between cylindrical shell 14 and sleeve 24. An electrically conductive copper anode plate 29 is soldered to the underside of anode member 13. A power connection 30 to anode plate 29 is provided together with cooling means 31, illustrated herein as a divider soldered to plate 29 having a spiral conduit through which cooling fluid is circulated.

The cathode structure at the lower end of cylindrical shell 14 is similarly constructed. An annular copper plate 32 is soldered to anode member 21 and is provided with power connection 33. A similar cooling means 51 having a spiral annulus is soldered to the underside of plate 32 and is also supplied with cooling fluid.

The igniter means 22 includes an inverted cup-shaped igniter element 34 formed from synthetic sapphire or similar dielectric material such as fused alumina or zirconia. The igniter element 34 is secured to a glass nipple 35 through which lead-in cable 36 provides an electrical connection to an auxiliary mercury pool 37 confined within the hollow igniter element 34. The mercury level of auxiliary pool 37 is higher than the level of the cathode pool 23. Nipple 35 is secured around its outer periphery to a well 38 depending from the center of annular cathode member 21. Electrical insulation 39 is provided between the walls of nipple 35 and lead-in cable 36. An electrical potential is established across the anode and cathode of the described tube by connecting a power supply across power connections 30, 33. No electrons are emitted from the cold mercury cathode pool 23; hence, no current initially flows through the tube. The tube is made conductive by passing a pulse of current through a circuit including igniter element 34 and the cathode pool 23, whereupon ionization of the cathode mercury begins and continues so long as a potential difference is maintained between the anode and cathode pools. The arc thus established from cathode to anode passes upwardly through sleeve 24, then radially outwardly below baffle 25 through the peripheral opening 40 at the top of the sleeve, and then downwardly to the anode pool 26.

Mercury vapor formed within the tube expands through apertures 41 in the top of the inner dome 15 into the space between hemispherical shell 12 and the dome which forms an expansion chamber 42. Hemispherical shell 12 functions as a vapor condensing means readily dissipating heat to the atmosphere surrounding the tube. Mercury vapor contacting the extensive heat transfer surface of the hemispherical shell 12 is condensed and flows downwardly to the anode mercury pool 26. As more clearly appears in FIG. 3 inner dome 15 separates from anode pool 26 an annular pool 42 around the inner periphery of hemispherical shell 12 which receives the mercury condensate directly from the condensing surfaces. Pool 42 is connected below the mercury surface with the main portion of the anode pool 26 by means of a plurality of ports 43 through the lower margin of the inner dome 15.

Excess mercury in the anode pool flows over ring 27 down annulus 28 between the cylindrical shell 14 and sleeve 24 into annular portion 44 of the cathode pool. It will be observed in FIG. 2 that mercury overflowing from the anode pool falls into the portion 44 and not into the main cathode pool. This annular portion is connected to the main cathode pool by means of a plurality of ports 45 around the bottom periphery of sleeve 24 which communicate annular portion 44 with the main cathode pool 23. Conical baffle 25 prevents mercury condensate from returning directly to the cathode pool.

An arc shield 46, resting upon a plurality of separated lugs 47 formed around the periphery of sleeve 24, baffles annular space 28 and thereby helps prevent arcbacks during intervals when anode-cathode polarities are reversed. The arc shield also helps prevent the arc discharge from passing down annulus 28 and shorting out the tube. The overflow mercury passing down annulus 28 is baffled by the foot of the arc shield 46 and broken up so that the flow is not continuous and does not provide a path for an electrical short circuit between anode and cathode. Clamp means 48 secures the arc shield 46 firmly against supporting lugs 47.

The hemispherical shell 12 is provided with a nipple 49 at its top in the illustrated embodiment through which the tube is evacuated. The nipple is sealed by cap means 50.

It will be observed that mercury impurities and dross, which float on the mercury surface, are trapped either in pool 42 of the anode pool or in portion 44 of the cathode pool, whereas the clean mercury flows freely below the surface through ports 43, 45, respectively. Hence, the mercury within the tube is cleaned as the tube operates. This feature is very important for obtaining uniform tube firing characteristics and long tube life.

The described tube, among other applications, is useful as a rectifier or as an electronic switch. Tubes as described have been constructed having enormous current carrying capacities in excess of 2,000 amperes (peak) and 400 amperes (average) at a 1,200 volt anode-cathode potential. Inverse voltages in the order of 1,200 volts have been experienced without backfiring.

The foregoing detailed description has been given for clearness of understanding only and no unnecessary limitations should be understood therefrom, for certain modifications will be obvious to those skilled in this art. The invention is defined in the following claims.

I claim:

1. In a mercury discharge tube having an evacuated envelope, a mercury cathode pool, a mercury anode pool spaced from said cathode pool and igniter means within said cathode pool, an improved vapor condensing means comprising a dielectric dome embracing said anode pool and having at least one opening above the surface of said anode pool; a vapor condensing dome concentric with said dielectric dome defining an expansion chamber between said domes, the peripheral extremity of said expansion chamber depending into said anode pool; and port means at the lower margin of said dielectric dome communicating said expansion chamber with said anode pool.

2. In a mercury discharge tube having an evacuated envelope, a mercury cathode pool, an annular mercury anode pool spaced above said cathode pool, and igniter means within said cathode pool, an improved vapor condensing means comprising a dielectric dome embracing said anode pool and having at least one opening above the surface of said anode pool, a vapor condensing dome concentric with said dielectric dome defining an expansion chamber between said domes, the peripheral extremity of said expansion chamber depending into said anode pool; and port means at the lower margin of said dielectric dome communicating said expansion chamber with said anode pool.

3. A mercury discharge tube having an evacuated envelope comprising a substantially hemispherical shell, a depending well and an annular anode member closing the annular space between said shell and said depending well; a cathode pool contained within said well, ring weir means around the upper perimeter of said well defining an annular anode pool upon said anode member; a sleeve within said well extending from below the surface of said cathode pool to a level above the surface of said anode pool and defining an annulus between said well and said sleeve; an inner dome within said shell having at least one opening communicating with an expansion chamber defined between said dome and said shell; igniter means within said cathode pool; an arc shield baffling the annulus between said well and said sleeve; port means communicating said expansion chamber with said anode pool below the surface of said anode pool; and port means communicating said annulus with said cathode pool below the surface of said cathode pool.

4. A mercury discharge tube having an evacuated envelope comprising a substantially hemispherical metallic shell, a depending cylindrical well and an electrically conductive annular anode member closing the annular space between said shell and said depending well; a cathode pool contained within said well; ring weir means around the upper perimeter of said well defining an annular anode pool upon said anode member; a sleeve within said well extending from below the surface of said cathode pool to a level above the surface of said anode pool and defining an annulus between said well and said sleeve; an inner dielectric dome within said shell defining an expansion chamber between said dielectric dome and said shell, said dome extending below the surface of said anode pool and having at least one opening communicating with said expansion chamber; igniter means within said cathode pool; an arc shield baffling the annulus between said well and said sleeve; port means communicating said expansion chamber with said anode pool below the surface of said anode pool; and port means communicating said annulus with said cathode pool below the surface of said cathode pool.

5. In a mercury discharge tube an improved cathode structure including a cathode pool; means separating said cathode pool into a first portion and a second portion receiving recycled mercury condensate; port means communicating said second portion with said first portion below the surface of said pool; and igniter means projecting upwardly through the first portion of said cathode pool including an inverted dielectric cup, an auxiliary pool of mercury sealed within said cup and having its top surface at a level higher than the top surface of said cathode pool, and circuit means connecting said auxiliary mercury pool and said cathode pool across an electrical voltage source.

6. A mercury discharge tube including an evacuated envelope; a mercury cathode pool; an annular mercury anode pool spaced above said cathode pool; igniter means within said cathode pool; vapor condensing means conducting condensed mercury vapors to said anode pool; and conduit means communicating said anode pool with said cathode pool for interruptively returning mercury directly to said cathode pool, said conduit means comprising an annulus defined between a well depending from said anode and containing said cathode pool and a concentric sleeve within said well, said sleeve extending upwardly from below the surface of said cathode pool to a level above the surface of said anode pool.

References Cited in the file of this patent

UNITED STATES PATENTS

| | | |
|---|---|---|
| 1,402,931 | Herwitt | Jan. 10, 1922 |
| 2,473,232 | Warmoltz | June 14, 1949 |
| 2,516,736 | Warmoltz | July 25, 1950 |
| 2,728,015 | Vang | Dec. 20, 1955 |